United States Patent Office 3,153,080
Patented Oct. 13, 1964

3,153,080
ACYLOXYNEOPENTYL AND ACYLOXYCYCLO-
BUTANE PHOSPHATE PARTIAL ESTERS
John R. Caldwell, Kingsport, Tenn., assignor to Eastman
Kodak Company, Rochester, N.Y., a corporation of
New Jersey
No Drawing. Filed Jan. 31, 1961, Ser. No. 85,969
3 Claims. (Cl. 260—461)

This invention relates to novel phosphate and phosphite esters and a method of preparation thereof. More particularly, the invention is concerned with the preparation of esters derived from alicyclic hydroxy compounds.

Phosphate esters of glycerine and glycols are relatively unstable toward hydrolysis and thermal decomposition, making them generally unsuitable for such uses as wetting agents, extreme pressure lubricants, additives for increasing the lubricity of synthetic lubricants, surfactants, emulsifying agents, degreasing agents and plasticizers and the like. After extended investigation I have found that by treating certain neopentyl alcohols with suitable phosphorus derivatives, neutral and acidic esters are formed which are highly stable toward both hydrolysis and thermal decomposition and accordingly are appropriate for the aforementioned uses.

Therefore, it is an object of the present invention to provide novel phosphate and phosphite esters having a high degree of stability toward hydrolysis and thermal decomposition. Another object of this invention is to provide novel phosphorus esters that are highly resistant to decomposition to phosphoric and phosphorous acids. A further object is to provide esters having a highly hindered or blocked structure which greatly reduces their hydrolysis rate. Still another object of the present invention is to provide a novel synthetic rubber sheeting containing phosphorus esters. A still further object of this invention is to provide a method for the preparation of the aforementioned phosphate and phosphite esters.

In accordance with my invention, broadly, neopentyl alcohols are reacted with phosphorus derivatives to give novel phosphorus esters containing a neopentyl or hindered structure which imparts thereto improved hydrolytic and thermal stability. The esters provided by my invention may be characterized by one of the following formulas, or they may consist of a mixture of more than one ester coming within the scope of these formulas.

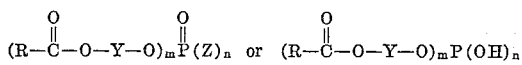

In these formulas R may be a straight or branched chain alkyl radical containing from 1 to 20 carbon atoms, a cyclic alkyl, aryl, or alkylene group. Y represents either

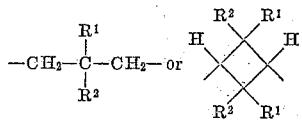

wherein $R^1$ and $R^2$ are alkyl radicals having from 1 to 4 carbon atoms, and Z is either —OH or

In the latter formula, $R^3$ and $R^4$ may be the same or different, but are either a hydrogen atom, an alkyl radical having from 1 to 6 carbon atoms, or a phenyl radical. $m$ is an integer from 1 to 2, and $n$ is a number such that the sum of $n$ and $m$ is 3. In general, the method for producing the novel phosphorus esters of the above configuration consists of reacting an ester-alcohol of the formula $$R-\overset{\overset{O}{\|}}{C}-O-Y-OH$$

wherein R and Y are as defined above, with a phosphorus compound having, for example, one of the following formulas:

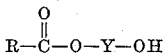

$P_2O_5$, $POCl_3$, $PCl_3$, $C_6H_5NHPOCl_2$, $ClPO[N(C_4H_9)_2]_2$, and $ClPO(NHC_8H_{17})_2$. The reaction may be conveniently carried out at room temperature in an appropriate organic solvent such as ethylene dichloride, dioxane, toluene, or ether and the reaction may be catalyzed by pyridine, triethylamine, or other appropriate catalyst, depending upon whether it is desired to form a neutral or acidic phosphite or phosphate or a phosphonate. The reaction requires from about 1 to about 12 hours for completion. The esters or ester-alcohols to be reacted with the appropriate phosphorus-containing compound may be conveniently prepared by heating 1 molecular proportion of a carboxylic acid with 3 to 5 molecular proportions of the appropriate glycol and subsequently removing the excess glycol by distillation or solvent treatment. Acid chlorides or anhydrides may be used, as may be ester interchange methods. When it is desired to prepare acid phosphates, the alcohol or glycol-esters may be reacted with $P_2O_5$. They may also be made by treatment with $POCl_3$ to give $(RO)POCl_2$ and $(RO)_2POCl$, followed by hydrolysis. The R is as represented above. The acid phosphates may be used as the free acids, or they may be neutralized with sodium hydroxide, potassium hydroxide, calcium oxide, or amines. When it is desired to prepare neutral phosphates, the alcohols may be reacted with $POCl_3$ in the presence of a tertiary amine or other base. Neutral phosphites having the structure $(RO)_2POH$ may be made by treating the alcohols with $PCl_3$ in the absence of a base, whereas phosphites having the structure $(RO)_3P$ are obtained if a base is used. By the same general method of preparation, it is possible to prepare phosphonates and derivatives containing a phosphorus-nitrogen linkage such as

where the nitrogen may contain one or more alkyl or aryl substituents or hydrogen. An extreme pressure lubricant may be prepared from the phosphate ester products by mixing them with an appropriate alcohol such as lauryl and mineral oil. Also, they may be added as a plasticizer to butadiene-acrylonitrile synthetic rubber and the rubber thereafter extruded as thin sheets highly resistant to hydrolysis and thermal decomposition.

The invention is further illustrated in the following examples:

*Example I*

One molecular proportion of single pressed stearic acid was heated at 210–220° C. with 4 molecular proportions of 2,2-dimethyl-1,3-propanediol until the acid number was approximately 1.0 or less. A trace of titanium isopropoxide was used as catalyst. The mixture was then washed several times with hot water to remove excess glycol and dried by heating in vacuum at 70–80° C. The product was a wax that melted at 40–45° C. One molecular proportion of $P_2O_5$ was added with stirring and cooling to 4 molecular proportions of the glycol monostearate dissolved in ethylene dichloride. The ethylene dichloride was removed by vacuum distillation at 50–60° C. The product was a wax that consisted of a mixture of mono- and dialkyl phosphates having the structures:

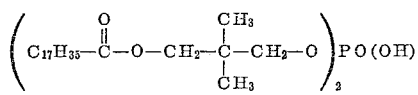

and

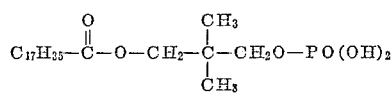

The product was useful as an additive for extreme pressure lubricants. The alkali metal and amine salts, when used as surfactants, showed excellent resistance to hydrolysis.

The above product was neutralized with triamylamine. The resulting salt proved useful as an additive for synthetic lubricants. Two parts of the salt were added to 98 parts of dioctyl azelate. The ester showed improved lubricating action, especially under heavy loads.

The sodium salt was demonstrated to be of particular value as a surfactant and emulsifying agent for use in strongly alkaline solutions. For example, an emulsion was prepared by mixing 15 g. of the sodium salt, 85 g. of kerosene, 10 g. of sodium hydroxide and 500 cc. of water in a high speed colloid mill. The emulsion was useful as a degreasing agent. Although the emulsion had a pH of 12–13, the phosphate ester showed no evidence of hydrolysis, even after standing 48 hours.

*Example II*

One molecular proportion of technical lauric acid was heated with 4 molecular proportions of 2,2-dimethyl-1,3-propanediol at 200–210° C. until an acid number of less than 1.0 was obtained. A trace of titanium isopropoxide was used as catalyst. The excess glycol was removed by washing with hot water. The product was an oil. Three molecular proportions of the glycol monolaurate was treated with $POCl_3$ in the presence of pyridine to give

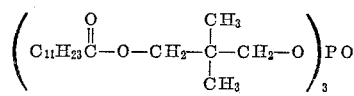

The product was a viscous oil. It was used as a plasticizer and as a synthetic lubricant and exhibited a high degree of thermal stability and resistance to hydrolysis. It showed utility as an additive for petroleum oils and ester-type lubricants.

Fifteen parts of the above phosphate ester were mixed with 85 parts of butadiene-acrylonitrile synthetic rubber as a plasticizer. The rubber was extruded as thin sheets. Exposure of the sheets to 5% sodium hydroxide solution for 2 weeks caused no appreciable hydrolysis of the plasticizer.

*Example III*

One molecular proportion of isobutyric anhydride was heated at 90–100° C. for 12 hours with 5 molecular proportions of 2-methyl-2-ethyl-propane-1,3-diol. Pyridine was used as a catalyst. The butyric acid and excess glycol were removed by washing with hot water. The product was dried by heating in vacuum at 70–80° C. Two molecular proportions of the glycol mono-isobutyrate were treated with one molecular proportion of $P_2O_5$. The product, a mixture of acid phosphates, was used as an ore flotation agent.

*Example IV*

The mono-isobutyrate of 2,2,4,4-tetramethyl-1,3-cyclobutanediol was treated with $PCl_3$ in the presence of base to give the trialkyl phosphite. The product was used efficiently as a plasticizer and lubricating oil additive.

*Example V*

The monohexanoate of 2,2-diethyl-1,3-propanediol was treated with dichlorophenylphosphine oxide in the presence of pyridine to give

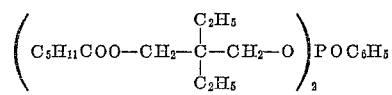

The phosphate ester was used as the lubricant in a gear box that was operated at a temperature of 150–160° C. and was exposed to moisture. The lubricant showed no appreciable hydrolysis or decomposition after 4 weeks of use.

*Example VI*

The mono-isobutyrate of 2,2,4,4-tetramethyl-1,3-cyclobutanediol was treated with $C_6H_5NHPOCl_2$ in the presence of triethylamine to give

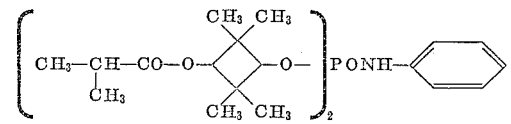

The compound exhibited good plasticizer activity.

*Example VII*

One molecular proportion of technical palmitic acid and 4 molecular proportions of 2,2,4,4-tetramethyl-1,3-cyclobutanediol were heated at 200–210° C. for 3–4 hours, using a trace of dibutyltin diacetate as catalyst. The acid number was less than 2. The mixture was then washed with hot water to remove excess glycol and dried by heating in vacuum at 70–80°. The ester was a wax that melted at 40–50° C. The product was principally the monopalmitate of 2,2,4,4-tetramethyl-1,3-cyclobutanediol. 382 g. (1.0 mole) of this monopalmitate ester was dissolved in 1000 ml. of ethylene dichloride. The solution was stirred at 20–30°, and 35.5 g. (0.25 mole) of $P_2O_5$ were added in small portions during a period of 1 hour. The mixture was then stirred at 20–30° for 12 hours to complete the reaction. The product was a wax that consisted of a mixture of mono- and dialkyl phosphates having the structures.

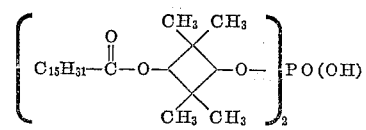

and

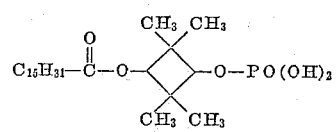

Part of the product was neutralized to a pH of 8.0–8.5 by the addition of aqueous sodium carbonate solution to the ethylene dichloride solution. The salt was isolated by evaporating the ethylene dichloride and water. The product was a wax. It gave a soapy dispersion in water and was a powerful wetting agent. The utility of the product was demonstrated by adding it to a strongly alkaline solution as a wetting agent. In this use substantially no hydrolysis of the ester resulted.

A second part of the product was neutralized to a pH of 7.0–7.5 by the addition of N,N-diethylcyclohexylamine.

The salt was isolated by evaporating the ethylene dichloride. This salt was especially valuable as an additive for increasing the lubricity of petroleum oils for use in extreme pressure applications. An extreme pressure lubricant was prepared by mixing 2 parts of the phosphate salt and 5 parts of technical lauryl alcohol with 93 parts of mineral oil. Additional utility was demonstrated by adding 3 parts of the salt to 97 parts of 2,2-dimethyl-1,3-propanediol dipelargonate. The lubricity of the synthetic lubricant, especially under heavy load, was greatly increased.

*Example VIII*

In this example two esters of the present invention were compared with a prior art ester as to hydrolytic stability. Two grams of the mixed mono- and dialkyl phosphate product of Example I and 2 grams of sodium hydroxide were dissolved in 50 cc. of water and the solution refluxed for 6 hours. An aliquot portion of the solution was titrated with standard HCl solution, and the unreacted sodium hydroxide was determined. By this determination, it was calculated that the ester was 20–24% hydrolyzed. Two g. of the salt prepared by the neutralization of the mixture of mono- and dialkyl phosphates of Example VII were boiled in aqueous sodium hydroxide. Less than 5% hydrolysis resulted. As compared to the hydrolytic stability of the preceding two products, 2 g. of glycerine monolaurate phosphate treated in the same manner showed 80 to 90% hydrolysis.

*Example IX*

In this example the thermal stability of 2 additional esters of the present invention were compared with the thermal-stability of a typical prior art ester. 100 g. of the combination of Example II were heated at 575° F. in a stream of pure nitrogen. Samples were taken at intervals and titrated for acidity. The rate of acid formation was found to be 0.08% per hour. The compound of Example VI was treated in a similar manner and showed a decomposition rate of 0.06% per hour. The phosphate of diethylene glycol monolaurate, on the other hand, upon being similarly treated exhibited a decomposition rate greater than 1.0% per hour.

*Example X*

The monobenzoate of 2,2-diethyl-4,4-dimethyl-1,3-cyclobutanediol was treated with ClPo[N(C₄H₉)₂]₂ in pyridine to make

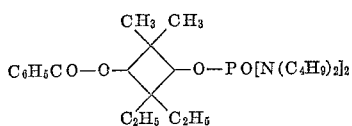

The compound proved useful as a plasticizer and as an additive for extreme pressure lubricants.

*Example XI*

The monobenzoate of 2,2-dimethyl-1,3-propanediol was treated with ClPO(NHC₈H₁₇)₂ in the presence of pyridine to form

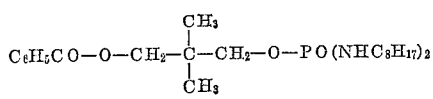

This compound was highly satisfactory as a plasticizer and as an additive for extreme pressure lubricants.

It can already be seen from the preceding description and examples that the novel phosphate and phosphite esters of this invention exhibit a surprisingly high degree of stability against both thermal-degradation and hydrolysis and are accordingly highly useful as surfactants, plasticizers, degreasing agents, emulsifiers, and the like.

The invention has been described in detail with particular reference to preferred embodiments thereof, but it will be understood that variations and modifications can be effected within the spirit and scope of the invention as described hereinabove and as defined in the appended claims.

I claim:

1. Esters comprising compounds and a mixture of compounds having a formula selected from the group consisting of $$(R-\overset{O}{\underset{\|}{C}}-O-Y-O)_m P(Z)_n \text{ and } (R-\overset{O}{\underset{\|}{C}}-O-Y-O)_m P(OH)_n$$

wherein R is selected from the group consisting of straight and branched chain alkyl having from 1 to 20 carbon atoms, cyclic alkyl containing 6 to 10 carbon atoms and phenyl, Y is selected from the group consisting of

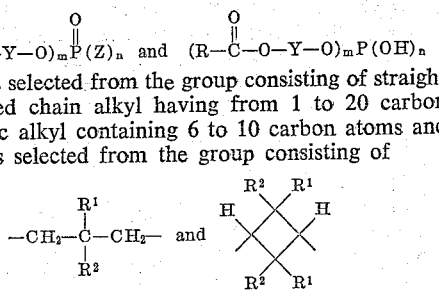

wherein $R^1$ and $R^2$ are alkyl having from 1 to 6 carbon atoms, Z is selected from the group consisting of —OH and

wherein $R^3$ and $R^4$ are selected from the group consisting of a hydrogen atom, alkyl having from 1 to 6 carbon atoms, and phenyl, m is an integer from 1 to 2 and n equals 3−m.

2. A phosphorus ester having a formula selected from the group consisting of

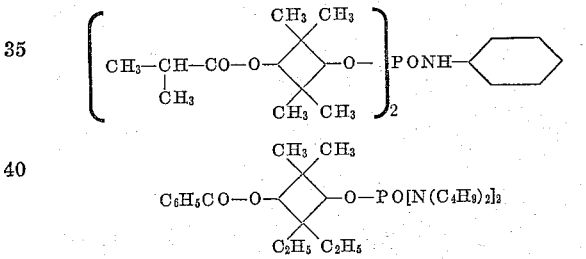

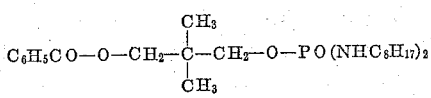

and

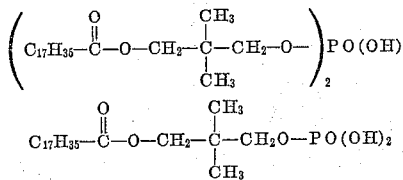

3. A phosphorus ester having a formula selected from the group consisting of a mixture of

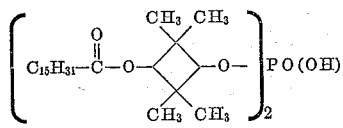

and a mixture of

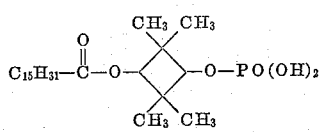

and (References on following page)

References Cited in the file of this patent

UNITED STATES PATENTS

| | | |
|---|---|---|
| 974,749 | Caulfield | Nov. 1, 1910 |
| 2,026,785 | Harris | Jan. 7, 1936 |
| 2,173,638 | Rozenbroek | Sept. 19, 1939 |
| 2,631,132 | McDermott | Mar. 10, 1953 |
| 2,678,304 | Buchner et al. | May 11, 1954 |
| 2,725,359 | Harman et al. | Nov. 29, 1955 |
| 2,726,256 | Morris et al. | Dec. 6, 1955 |
| 2,779,739 | Spivack | Jan. 29, 1957 |
| 2,830,069 | Smith | Apr. 8, 1958 |
| 2,843,557 | Safford | July 15, 1958 |
| 2,863,904 | Cantrell et al. | Dec. 9, 1958 |
| 2,881,147 | Graham | Apr. 7, 1959 |
| 2,950,290 | Hort | Aug. 23, 1960 |

OTHER REFERENCES

Khorana et al.: "J. Am. Chem. Soc.," vol. 79, pages 430–436 (1957).

Kosolapoff: "Organo-Phosphorus Compounds," John Wiley & Sons (1950, pp. 220–221).